(12) United States Patent
Ryu et al.

(10) Patent No.: US 12,352,701 B2
(45) Date of Patent: Jul. 8, 2025

(54) DEVICE AND METHOD FOR INSPECTING LIQUID CRYSTAL STAIN OF POLARIZING PLATE

(71) Applicant: Shanjin Optoelectronics (Suzhou) Co., LTD., Jiangsu (CN)

(72) Inventors: Jae Il Ryu, Daejeon (KR); Taek Geun Nam, Daejeon (KR); Je Hyuk Yoo, Daejeon (KR)

(73) Assignee: Shanjin Optoelectronics (Suzhou) Co., LTD. (CN)

( * ) Notice: Subject to any disclaimer, the term of this patent is extended or adjusted under 35 U.S.C. 154(b) by 282 days.

(21) Appl. No.: 17/611,873

(22) PCT Filed: Mar. 9, 2020

(86) PCT No.: PCT/KR2020/003256
§ 371 (c)(1),
(2) Date: Nov. 16, 2021

(87) PCT Pub. No.: WO2020/246691
PCT Pub. Date: Dec. 10, 2020

(65) Prior Publication Data
US 2022/0228994 A1 Jul. 21, 2022

(30) Foreign Application Priority Data
Jun. 7, 2019 (KR) .................. 10-2019-0067543

(51) Int. Cl.
| | | |
|---|---|---|
| *G01N 21/94* | (2006.01) | |
| *G01N 21/55* | (2014.01) | |
| *G02B 1/14* | (2015.01) | |
| *G02B 5/30* | (2006.01) | |

(52) U.S. Cl.
CPC ............. *G01N 21/94* (2013.01); *G01N 21/55* (2013.01); *G02B 1/14* (2015.01); *G02B 5/3016* (2013.01); *G02B 5/3025* (2013.01); *G02B 5/3083* (2013.01); *G01N 2021/945* (2013.01)

(58) Field of Classification Search
CPC ....... G01N 2021/216; G01N 2021/218; G01N 2021/8848; G01N 2021/945; G01N 2021/9513; G01N 21/55; G01N 21/8803; G01N 21/8806; G01N 21/94; G01N 21/95; G02B 1/14; G02B 5/3016; G02B 5/3025;
(Continued)

(56) References Cited

U.S. PATENT DOCUMENTS

| | | |
|---|---|---|
| 5,973,760 A | 10/1999 | Dehmlow |
| 2003/0067582 A1 | 4/2003 | Hara |
| 2007/0075279 A1 | 4/2007 | Michniewicz et al. |

FOREIGN PATENT DOCUMENTS

| | | |
|---|---|---|
| CN | 107643292 A | 1/2018 |
| JP | 1999-125717 A | 5/1999 |
| JP | 2001-116925 A | 4/2001 |

(Continued)

*Primary Examiner* — Tri T Ton

(57) ABSTRACT

A device for inspecting a liquid crystal stain of a polarization plate, the device comprising a surface light source; a first polarization member; a polarization plate including a liquid crystal film; a second polarization member; and an inspection source, and a method using the device, the device and the method capable of easily inspecting liquid crystal stains generated on a polarization plate with excellent visibility.

10 Claims, 1 Drawing Sheet

(58) Field of Classification Search
CPC ................. G02B 5/3083; G02F 1/1309; G02F
1/133528; G02F 2203/69
See application file for complete search history.

(56) References Cited

FOREIGN PATENT DOCUMENTS

| | | | |
|---|---|---|---|
| JP | 2005069989 A | | 3/2005 |
| JP | 2006078426 A | | 3/2006 |
| JP | 2009-069054 A | | 4/2009 |
| JP | 4516648 B2 | | 8/2010 |
| JP | 4529366 B2 | | 8/2010 |
| JP | 2010534351 A | | 11/2010 |
| JP | 2011-149741 A | | 8/2011 |
| JP | 2012-053077 A | | 3/2012 |
| JP | 2012-068641 A | | 4/2012 |
| JP | 2012093664 A | * | 5/2012 |
| JP | 2016206217 A | | 12/2016 |
| JP | 2017-067664 A | | 4/2017 |
| KR | 10-2009-0060435 A | | 6/2009 |
| KR | 10-1594982 B1 | | 2/2016 |
| KR | 10-2018-0050802 A | | 5/2018 |
| KR | 10-2019-0013600 A | | 2/2019 |
| WO | 2014196637 A1 | | 12/2014 |
| WO | 2016194874 A | | 3/2018 |

* cited by examiner

[Figure 1]
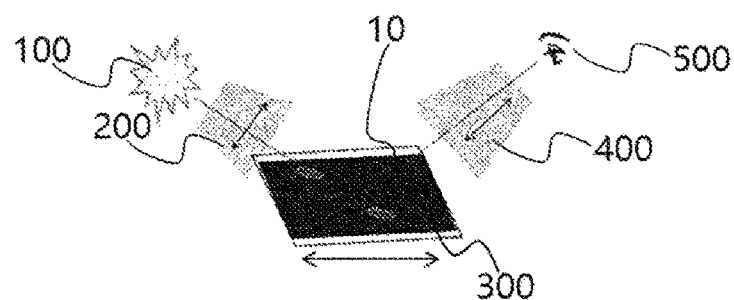
[Figure 2]
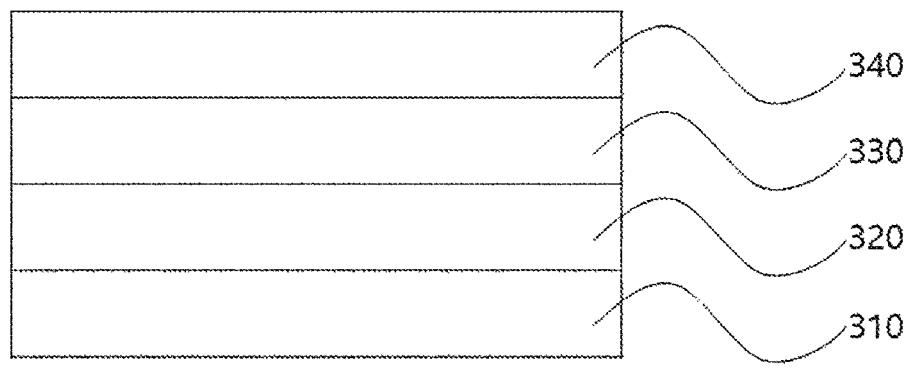

DEVICE AND METHOD FOR INSPECTING LIQUID CRYSTAL STAIN OF POLARIZING PLATE

CROSS-REFERENCE TO RELATED APPLICATIONS

The present application is a National Stage Application of International Application No. PCT/KR2020/003256 filed on Mar. 9, 2020, which claims priority to and benefit of Korean Patent Application No. 10-2019-0067543 filed on Jun. 7, 2019, disclosures of which are incorporated by reference in their entirety for all purposes as if fully set forth herein.

TECHNICAL FIELD

The present application relates to a liquid crystal stain inspection device of a polarization plate and a liquid crystal stain inspection method of a polarization plate.

BACKGROUND

Organic light emitting displays (OLEDs) have been expanded to various applications such as mobiles and TVs.

Such an organic light emitting display device comprises a polarization plate because a surface light source applied from the outside is reflected due to the metal electrode at the bottom to deteriorate panel visibility in a bright room environment.

In order to block the reflected light, the polarization plate comprises a quarter wave plate (QWP) that rotates the phase of light ¼ turn. Such a quarter wave plate may be implemented as a polymer film or a liquid crystal coating. However, in the case of implementing the liquid crystal coating with the quarter wave plate, there was a problem that liquid crystal stains, the color sense whose looks different upon reflection, were caused by the thickness deviation or pressing of the liquid crystal layer or the like.

There was a problem that such liquid crystal stains were difficultly identified with a general inspection method and more difficultly identified upon attaching a protective film and/or a release film on a finished product of a polarization plate. Accordingly, in order to solve this problem, there is a need for a device and a method for inspecting a liquid crystal stain of a polarization plate.

DISCLOSURE

Technical Problem

It is an object of the present application to provide a device and a method for inspecting a liquid crystal stain of a polarization plate, which are capable of easily inspecting liquid crystal stains generated on the polarization plate with excellent visibility.

Technical Solution

In order to solve the above object, the device for inspecting a liquid crystal stain of a polarization plate in the present application comprises a surface light source, a first polarization member disposed such that light is applied thereto from the surface light source, a polarization plate disposed such that the light transmitted through the first polarization member is applied thereto and reflecting the applied light, a second polarization member disposed such that the light reflected from the polarization plate is applied thereto, and an inspection source disposed such that the light transmitted through the second polarization member is applied thereto and determining liquid crystal stains of the polarization plate based on the light transmitted through the second polarization member, wherein the polarization plate sequentially comprises a polarizer and a quarter wave plate including a liquid crystal film and the light transmitted through the first polarization member is applied to the quarter wave plate of the polarization plate.

In addition, the surface light source may emit unpolarized light toward the first polarization member.

In addition, the light emitted from the surface light source may have an incident angle of 30° to 60° to the polarization plate.

In addition, the first polarization member may have an absorption axis perpendicular to the polarizer of the polarization plate.

In addition, the polarization plate may further comprise a protective film and a release film, where it may sequentially comprise the protective film, the polarizer, the quarter wave plate and the release film.

In addition, the polarization plate may be a polarization plate for an organic light emitting display device.

In addition, the liquid crystal film may sequentially comprise a base film and a liquid crystal layer.

In addition, the liquid crystal layer may comprise a polymerizable liquid crystal compound in a polymerized state.

In addition, the light transmitted through the first polarization member may be reflected from the polarizer of the polarization plate.

In addition, the light reflected and emitted from the polarizer of the polarization plate may have a reflection angle of 30° to 60° to the polarization plate.

In addition, the second polarization member may have an absorption axis parallel to the polarizer of the polarization plate.

In addition, the light reflected from the polarization plate may be applied to the second polarization member.

In addition, the method for inspecting a liquid crystal stain of a polarization plate in the present application relates to a liquid crystal stain inspection method of a polarization plate using the liquid crystal stain inspection device of the polarization plate, which comprises steps of emitting light from the surface light source and transmitting the light through the first polarization member, the polarization plate and the second polarization member sequentially, and determining liquid crystal stains of the polarization plate based on the light transmitted through the second polarization member and applied to the inspection source.

In addition, the light applied to the polarization plate may be reflected therefrom.

Advantageous Effects

According to the device and the method for inspecting a liquid crystal stain of a polarization plate in the present application, it is possible to easily inspect liquid crystal stains generated on the polarization plate with excellent visibility.

DESCRIPTION OF DRAWINGS

FIG. 1 is a diagram illustrating a device for inspecting a liquid crystal stain of a polarization plate according to one example of the present application.

FIG. 2 is a diagram illustrating a polarization plate according to one example of the present application.

BEST MODE

Hereinafter, a device and a method for inspecting a liquid crystal stain of a polarization plate in the present application will be described with reference to the accompanying drawings, where the accompanying drawings are illustrative, and the device and the method for inspecting a liquid crystal stain of a polarization plate and in the present application is not limited to the accompanying drawings.

FIG. 1 is a diagram showing a device for inspecting a liquid crystal stain of a polarization plate according to one example of the present application. As shown in FIG. 1, the device for inspecting a liquid crystal stain of a polarization plate in the present application comprises a surface light source (100), a first polarization member (200), a polarization plate (300), a second polarization member (400) and an inspection source (500). FIG. 2 is a diagram showing a polarization plate according to one example of the present application. As shown in FIG. 2, the polarization plate (300) comprises a polarizer (320) and a quarter wave plate (330) sequentially. Also, the quarter wave plate (330) comprises a liquid crystal film (not shown). In addition, the light transmitted through the first polarization member is applied to the quarter wave plate (330) of the polarization plate (300). The device for inspecting a liquid crystal stain of a polarization plate in the present application can easily inspect liquid crystal stains (10) generated on the polarization plate (300) with excellent visibility.

In this specification, the term "located sequentially" may mean a state where the respective components are located in parallel in a series structure.

The surface light source (100) is a light source having a uniformly shining surface and no thickness, which can be distinguished from a conventional point or line-shaped light source. In one example, the liquid crystal stains in the present application are irregular stains as irregularly formed, where in the case of using the point light source without diffusion by a light guide plate, the visibility of the liquid crystal stains is lowered, so that the liquid crystal stains of the polarization plate can be inspected using the surface light source.

The surface light source (100) may emit unpolarized light vibrating in various directions. As the surface light source (100), various types of surface light source lamps emitting various white light or having a continuous spectrum in a spectral range of a visible light region may be used. By using the unpolarized light as the surface light source, the manufacturing cost and maintenance cost of the liquid crystal stain inspection device of the polarization plate may be inexpensive. In another example, as the surface light source (100), the light that the point light source or the line light source is diffused by the light guide plate to perform the same function as the surface light source may be used.

The surface light source (100) may emit unpolarized light toward the first polarization member (200). The surface light source (100) from which the unpolarized light is emitted may be polarized in a direction parallel to the transmission axis of the first polarization member (200) while penetrating the first polarization member (200).

In addition, the light quantity of the surface light source (100) may be adjusted. For example, the surface light source (100) may improve visibility by increasing the light quantity.

In addition, the incident angle of the light emitted from the surface light source (100) may be adjusted. In one example, the light emitted from the surface light source (100) may have an incident angle of 30° to 60° to the polarization plate (300). For example, the incident angle of the light emitted from the surface light source (100) to the polarization plate (300) may be 35° to 55° or 40° to 50°. As the incident angle of the light emitted from the surface light source (100) satisfies the above-described range, visibility of liquid crystal stains may be excellent. In addition, when the incident angle of the light emitted from the light source (100) is lower than the above-described range, it can be difficult to perform the detection due to a small visual appreciation difference, and when it is higher than the above-described range, it can be difficult to detect liquid crystal stains due to large surface reflection.

The first polarization member (200) is a part for polarizing the light emitted from the surface light source in a specific direction, which may be disposed so that light is applied thereto from the surface light source.

In this specification, the term "polarization member and polarizer" may mean a functional layer exhibiting anisotropic transmission characteristics with respect to incident light while having a transmission axis formed in either direction. For example, the polarization member and polarizer may have a function of transmitting light vibrating in one direction from incident light vibrating in various directions, and reflecting or absorbing light vibrating in the other directions. Such a polarizer may be, for example, a reflecting polarizer or an absorbing polarizer, and the first polarization member, the second polarization member and the polarizer of the present application may be absorbing polarizers.

In this specification, the term "absorbing polarizer" may mean a layer that transmits light having a direction parallel to a transmission axis from incident light vibrating in various directions, and absorbs and blocks light vibrating in the other directions. In one example, the absorbing polarizer may have a transmission axis and an absorption axis orthogonal to each other in a plane direction. For example, the angle formed by the transmission axis and the absorption axis may be 85° to 95°, or 90°, and the light vibrating in a direction parallel to the transmission axis may be transmitted, and the light vibrating in a direction parallel to the absorption axis may be reflected or absorbed.

In this specification, when the term such as vertical, parallel, orthogonal or horizontal is used while defining an angle, it means substantially vertical, parallel, orthogonal or horizontal to the extent that the desired effect is not impaired, which includes, for example, an error that takes a production error or a deviation (variation), and the like, into account. For example, each case of the foregoing may include an error within about ±15°, an error within about ±10° or an error within about ±5°.

As the absorbing polarizer, a conventional absorbing polarizer known in the art may be used. For example, as the absorbing polarizer, a stretched polymer film, for example, a polyvinyl alcohol (PVA) film or the like, dyed with an iodine compound or an organic dye may be used. Such an absorbing polarizer may generally have a transmission axis and an absorption axis orthogonal to the transmission axis.

In one example, the first polarization member (200) may have an absorption axis perpendicular to the polarizer (320) of the polarization plate (300). Specifically, when the first polarization member (200) has an absorption axis in a first direction (shown as ↔), the polarizer (320) of the polarization plate (300) may have an absorption axis in a second direction (shown as ↕) orthogonal to the absorption axis of the first polarization member (200), and the first polarization member (200) and the polarizer (320) of the polarization plate (300) may have transmission axes in a direction (not shown) orthogonal to each absorption axis. As the first polarization member and the polarizer of the polarization plate have absorption axes perpendicularly, the light transmitted through the first polarization member (200) and linearly polarized may form circularly polarized light through the quarter wave plate (330) of the polarization plate (300), as described below, and the circularly polarized light may be reflected by the polarizer (320) of the polarization plate (300), specifically, by the interface between the polarizer (320) of the polarization plate (300) and a protective film (310) to be described below.

The polarization plate (300) is a sample to be measured for inspecting liquid crystal stains (10), which may be included in an inspection part (not shown). For example, the polarization plate (300) may be disposed on the inspection part.

The polarization plate (300) is disposed so that the light transmitted through the first polarization member (200) is applied thereto, and reflects the applied light. For example, the light transmitted through the first polarization member (200) and linearly polarized may form circularly polarized light through the quarter wave plate (330) of the polarization plate (300), and the circularly polarized light may be reflected by the polarizer (320) of the polarization plate (300), specifically, by the interface between the polarizer (320) of the polarization plate (300) and a protective film (310) to be described below. By reflecting the light from the polarizer (320) of the polarization plate (300), the reflected light may be changed from right circularly polarized light to left circularly polarized light, or from left circularly polarized light to right circularly polarized light.

In addition, as shown in FIG. 2, the polarization plate (300) may further comprise a protective film (310) and a release film (340). Specifically, the polarization plate (300) may sequentially comprise a protective film (310), a polarizer (320), a quarter wave plate (330) and a release film (340). When the polarization plate (300) further comprises a protective film (310) and a release film (340), the light transmitted through the first polarization member (200) may be applied to the release film (340) of the polarization plate (300) and transmitted.

The protective film (310) is a film attached to protect the polarizer (320), which may be a protective film for a polarizer known in the art, such as a TAC sheet, but is not limited thereto.

In addition, the polarization plate (300) further comprises a pressure-sensitive adhesive layer (not shown) capable of attaching the polarization plate (300) to a panel when applied to an organic light emitting display device to be described below, where in order to protect the pressure-sensitive adhesive layer, the release film (340) may be attached to the pressure-sensitive adhesive layer. Specifically, the pressure-sensitive adhesive layer may be formed between the quarter wave plate and the release film. The pressure-sensitive adhesive layer may be composed of an acrylic pressure-sensitive adhesive, a silicone-based pressure-sensitive adhesive or a urethane-based pressure-sensitive adhesive, and a polyethylene terephthalate-based film or a polyolefin-based film may be used as the release film.

In one example, the polarization plate (300) may be a polarization plate for an organic light emitting display device. Specifically, the organic light emitting display device has a disadvantage that it is vulnerable to reflection of external light such as sunlight and lighting due to the exposure of the electrode, so that for blocking reflection of external light on the surface and having dark visual appreciation in a power-off state, it may comprise a polarizer for making the linearly polarized light and a quarter wave plate for making the circularly polarized light. However, the liquid crystal display device is a transmissive display device that changes the traveling direction of light or adjusts the intensity of light by using liquid crystals between two polarization plates, which comprises a polarizer for making linearly polarized light to the polarization plate, but does not require a quarter wave plate.

In this specification, the term "quarter wave plate" may mean a phase delay film capable of retarding incident light by ¼ times its wavelength. Such a quarter wave plate may play a role of making circularly polarized light into linearly polarized light or making linearly polarized light into circularly polarized light. In one example, the quarter wave plate may have a plane direction phase difference of 50 nm to 250 nm or 90 nm to 200 nm or so for light having a wavelength of 360 nm. In this specification, the term "plane direction phase difference" is a value calculated as "$(n_x - n_y) \times d$," where $n_x$ is the refractive index of the relevant layer in the planar slow axis direction, $n_y$ is the refractive index of the relevant layer in the planar fast axis direction and d is the thickness of the quarter wavelength film. In addition, in this specification, the term "slow axis" may mean an axis in the direction representing the highest refractive index in the quarter wave plate, and the slow axis may be used in the same meaning as a phase delay axis in this specification. have. In this specification, the term "fast axis" may mean an axis in the direction showing the lowest refractive index in the quarter wave plate, that is, the direction orthogonal to the slow axis.

In one example, the quarter wave plate (330) of the present application comprises a liquid crystal film. For example, the liquid crystal film may sequentially comprise a base film (not shown) and a liquid crystal layer (not shown). Specifically, the quarter wave plate (330) may be a liquid crystal film in which a liquid crystal layer is formed by orienting and polymerizing a polymerizable liquid crystal compound on the base film.

The liquid crystal layer may comprise a polymerizable liquid crystal compound in a polymerized state. In this specification, the term "polymerizable liquid crystal compound" may mean a compound containing a moiety capable of displaying liquid crystallinity, for example, a mesogen skeleton or the like, and containing one or more polymerizable functional groups. In addition, in this specification, the term "that comprises a polymerizable liquid crystal compound in a polymerized state" may mean a state where the liquid crystal compound is polymerized to form a skeleton such as a main chain or a side chain of a liquid crystal polymer in the liquid crystal layer. For example, the polymerizable liquid crystal compound may be included in the liquid crystal layer in a horizontally oriented state. In this specification, the term "horizontal orientation" may mean a case in which the optical axis of the liquid crystal layer comprising the polymerized liquid crystal compound has an inclination angle of about 0° to about 25°, about 0° to about 15°, about 0° to about 10°, about 0° to about 5° or about 0° with respect to the plane of the liquid crystal layer.

In one example, the light transmitted through the first polarization member (200) may be reflected from the polarizer (320) of the polarization plate (300). Specifically, the light transmitted through the first polarization member (200) and linearly polarized may be transmitted through the quarter wave plate (330) of the polarization plate (300) and circularly polarized, and the circularly polarized light may be incident on the polarizer (320) of the polarization plate (300) and rotated 180°. That is, the circularly polarized light incident on the polarizer (320) of the polarization plate (300)

may be reflected from right circularly polarized light to left circularly polarized light or from left circularly polarized light to right circularly polarized light.

At this time, the reflected light is transmitted through the quarter wave plate (330) of the polarization plate (300), whereby it may be aligned in a direction perpendicular to the light transmitted through the first polarization member (200) and linearly polarized. For example, when the reflected light is transmitted through a portion of the polarization plate (300) where the liquid crystal stain (10) is present to be linearly polarized, it may be aligned so that some are parallel and some are not parallel to the absorption axis of the second polarization member (400), whereby reflective visual appreciation may vary. In addition, when the reflected light is transmitted through a portion of the polarization plate (300) where the liquid crystal stain (10) is not present to be linearly polarized, all may be aligned perpendicular to the absorption axis of the second polarization member (400), that is, parallel to the transmission axis.

At this time, the light reflected and emitted from the polarizer (320) of the polarization plate (300) may have a reflection angle of 30° to 60° to the polarization plate (300). For example, the reflection angle of light reflected and emitted from the polarizer (320) with respect to the polarization plate (300) may be 35° to 55° or 40° to 50°. As the reflection angle of the light reflected and emitted from the polarizer (320) satisfies the above-described range, visibility of liquid crystal stains may be excellent. In addition, when the reflection angle of the light reflected and emitted from the polarizer (320) of the polarization plate (300) is lower than the above-described range, it can be difficult to perform the detection due to a small visual appreciation difference, and when it is higher than the above-described range, it can be difficult to detect liquid crystal stains due to large surface reflection.

The second polarization member (400) is a part that transmits and/or absorbs the light reflected from the polarization plate (300) according to the presence or absence of liquid crystal stains of the polarization plate (300), which is disposed so that the light reflected from the polarization plate (300) is applied. Specifically, the light reflected by applying a portion of the polarization plate (300) where liquid crystal stains are present may be partially transmitted through the second polarization member (400) and partially absorbed by the second polarization member (400). Conversely, all the light reflected by applying a portion of the polarization plate (300) where liquid crystal stains do not exist may be transmitted through the second polarization member (400). As the light reflected from the polarization plate is applied to the second polarization member, it is possible to inspect liquid crystal stains of the polarization plate through a color detected from the inspection source.

In one example, the second polarization member (400) may have an absorption axis parallel to the polarizer (320) of the polarization plate (300). That is, the second polarization member (400) may have an absorption axis perpendicular to the first polarization member (200). Specifically, when the second polarization member (400) has an absorption axis in the second direction (shown as $\updownarrow$ ), the polarizer (320) of the polarization plate (300) may also have an absorption axis in the second direction (shown as $\updownarrow$ ), and the second polarization member (400) and the polarizer (320) of the polarization plate (300) may each have a transmission axis in the first direction (shown as $\leftrightarrow$) orthogonal to the absorption axis. As the second polarization member and the polarizer of the polarization plate have absorption axes in parallel, it is possible to inspect liquid crystal stains of the polarization plate through the light applied to the second polarization member.

The inspection source (500) is a part for determining the liquid crystal stains (10) of the polarization plate (300) based on the light transmitted through the second polarization member (400), which is disposed so that the light transmitted through the second polarization member (400) is applied. Specifically, the light transmitted through the portion where the thickness difference occurs in the quarter wave plate (330) due to the presence of liquid crystal stains may be partially transmitted through the second polarization member (400) and partially absorbed by the second polarization member (400), whereby it appears green. That is, it may be determined that liquid crystal stains exist in the portion where the light transmitted through the second polarization member (400) appears green. In addition, all the light transmitted through the portion of the quarter wave plate (330) where the liquid crystal stain does not exist may be transmitted through the second polarization member (400) to show a bright color close to white. That is, it may be determined that liquid crystal stains do not exist in the portion where the light detected from the inspection source (500) shows a bright color.

In one example, in the inspection source (500), the inspection of the liquid crystal stain (10) in the polarization plate may be directly performed using the naked eye, and in another example, the inspection of the liquid crystal stain (10) in the polarization plate may be indirectly performed from an image obtained using an imaging device such as a video camera instead of the naked eye through a computer.

The present application also relates to a method for inspecting a liquid crystal stain of a polarization plate. An exemplary method for inspecting a liquid crystal stain of a polarization plate relates to an inspection method using the device for inspecting a liquid crystal stain of a polarization plate as described above. Therefore, specific matters related to the method for inspecting a liquid crystal stain of a polarization plate to be described below may be equally applied to the contents described in the device for inspecting a liquid crystal stain of a polarization plate, and thus will be omitted.

The method for inspecting a liquid crystal stain of a polarization plate in the present application comprises steps of transmitting and determining By using the method for inspecting a liquid crystal stain of a polarization plate in the present application, it is possible to easily inspect the liquid crystal stains generated on the polarization plate with excellent visibility.

The step of transmitting is a step of transmitting light using the device for inspecting a liquid crystal stain of a polarization plate as described above, wherein the light is emitted from the surface light source and sequentially transmitted through the first polarization member, the polarization plate and the second polarization member. The specific contents of the surface light source, the first polarization member, the polarization plate, the second polarization member and the traveling of light are the same as previously described for the device for inspecting a liquid crystal stain of a polarization plate, and thus will be omitted.

The step of determining is a step of determining liquid crystal stains in the polarization plate, which is determined as the liquid crystal stain of the polarization plate based on the light transmitted through the second polarization member and applied to the inspection source. That is, when the light reaches the inspection source from the surface light source to show a green color, it may be determined that liquid crystal stains exist on the polarization plate, and when the light reaches the inspection source from the surface light source to show a bright color close to white, it may be determined that liquid crystal stains do not exist on the polarization plate. Furthermore, the specific contents of the inspection source and the traveling of light are the same as previously described for the device for inspecting a liquid crystal stain of a polarization plate, and thus will be omitted.

In one example, the light applied to the polarization plate may be reflected. Specifically, the light transmitted through the polarizer of the polarization plate may be reflected at the polarizer of the polarization plate, more specifically, the interface between the polarizer of the polarization plate and the protective film. In the polarization plate, the liquid crystal stains of the polarization plate may be inspected through reflection of light. The specific contents of the reflection of the light are the same as previously described for the device for inspecting a liquid crystal stain of a polarization plate, and thus will be omitted.

Using a device for inspecting a liquid crystal stain of a polarization plate according to an exemplary embodiment of the present application, a device according to another exemplary embodiment, and a device which is not according to an exemplary embodiment, the inspection for detecting the liquid crystal stains of the polarization plate was performed.

The device for inspecting a liquid crystal stain of a polarization plate according to an exemplary embodiment of the present application used a surface light source as a light source, wherein the surface light source was applied to a first polarization member having an absorption axis in a first direction (↔) at an incident angle of 45° to the polarization plate and linearly polarized, and the linearly polarized light was applied to a quarter wave plate of the polarization plate where liquid crystal stains existed and right circularly polarized. Thereafter, the right circularly polarized light was applied to a polarizer of the polarization plate having an absorption axis in a second direction ( ↕ ), reflected by 180° and left circularly polarized. Thereafter, the left circularly polarized light was applied to the quarter wave plate of the polarization plate and transmitted through, whereby the transmitted light was aligned in a direction perpendicular to the light transmitted through the first polarization member and linearly polarized. Thereafter, as the linearly polarized light was applied to the second polarization member having an absorption axis in the second direction ( ↕ ) and transmitted, it was confirmed that liquid crystal stains of the polarization plate were detected through the light inspected from the inspection source to be inspected by the naked eye.

In addition, a liquid crystal stain inspection of a polarization plate was performed using the device according to another exemplary embodiment of the present application, by the same method as with the device according to the above said exemplary embodiment of the present application, except that the absorption axes of the first polarization member, the polarizer of the polarization plate, and the second polarization member were rotated by 90°.

In addition, a liquid crystal stain inspection of a polarization plate was performed using the device which is not according to an exemplary embodiment of the present application, by the same method as with the device according to the above said exemplary embodiment of the present application, except that a point light source was used instead of the surface light source as the light source.

That is, when the liquid crystal stains of the polarization plate are inspected using the device for inspecting a liquid crystal stain of a polarization plate which is not according to an exemplary embodiment of the present application, the liquid crystal stains of the polarization plate are detected, but the light quantity is not uniform and thus visibility is poor. Contrarily, when the liquid crystal stains of the polarization plate are inspected using the devices according to an exemplary embodiment and another exemplary embodiment of the present application, it is possible to inspect the liquid crystal stains of the polarization plate with excellent visibility.

DESCRIPTION OF REFERENCE NUMERALS

10: liquid crystal stain
100: surface light source
200: first polarization member
300: polarization plate
310: protective film
320: polarizer
330: quarter wave plate
340: release film
400: second polarization member
500: inspection source

The invention claimed is:

1. A device for inspecting a liquid crystal stain of a polarization plate, comprising:
   a surface light source;
   a first polarization member disposed such that light is applied thereto from the surface light source;
   a polarization plate disposed such that the light transmitted through the first polarization member is applied thereto, and reflecting the applied light;
   a second polarization member disposed such that the light reflected from the polarization plate is applied thereto; and
   an inspection source disposed such that the light transmitted through the second polarization member is applied thereto, and determining liquid crystal stains of the polarization plate based on the light transmitted through the second polarization member,
   wherein the polarization plate sequentially comprises a protective film, a polarizer and a quarter wave plate,
   wherein the quarter wave plate comprises a liquid crystal film,
   wherein the liquid crystal film sequentially comprises a base film and a liquid crystal layer,
   wherein the light transmitted through the first polarization member is applied to the quarter wave plate of the polarization plate,
   wherein the light transmitted, from the surface light source, through the first polarization member and linearly polarized is transmitted through the quarter wave plate of the polarization plate and circularly polarized, and the circularly polarized light is incident on the polarizer of the polarization plate, and the circularly polarized light incident on an interface between the protective film and the polarizer of the polarization plate is reflected from right circularly polarized light to left circularly polarized light or from left circularly polarized light to right circularly polarized light, and the reflected light is transmitted through the quarter wave plate of the polarization plate and is incident on the second polarization member,
   wherein the first polarization member has an absorption axis perpendicular to an absorption axis of the polarizer of the polarization plate, and wherein the second polarization member has an absorption axis parallel to the absorption axis of the polarizer of the polarization plate.

2. The device according to claim 1, wherein the surface light source emits unpolarized light toward the first polarization member.

3. The device according to claim 2, wherein the light emitted from the surface light source has an incident angle of 30° to 60° to the polarization plate.

4. The device according to claim 1, wherein the polarization plate further comprises a release film, and sequentially comprises the protective film, the polarizer, the quarter wave plate, and the release film.

5. The device according to claim 1, wherein the polarization plate is a polarization plate for an organic light emitting display device.

6. The device according to claim 1, wherein the liquid crystal layer comprises a polymerizable liquid crystal compound in a polymerized state.

7. The device according to claim 1, wherein the light transmitted through the first polarization member is reflected from the polarizer of the polarization plate.

8. The device according to claim 1, wherein the light reflected and emitted from the polarization plate has a reflection angle of 30° to 60° to the polarization plate.

9. A method for inspecting a liquid crystal stain of a polarization plate using the device according to claim 1, which comprises steps of:
  emitting light from the surface light source and transmitting the light through the first polarization member, the polarization plate and the second polarization member sequentially; and
  determining liquid crystal stains of the polarization plate based on the light transmitted through the second polarization member and applied to the inspection source.

10. The method according to claim 9, wherein the light applied to the polarization plate is reflected therefrom.

* * * * *